United States Patent Office 3,321,523
Patented May 23, 1967

3,321,523
N - (β - DIETHYLAMINO ETHYL) - N - [β - (p-METHOXY PHENYL)ETHYL]ANILINES AND SALTS THEREOF
Hugo Zellner, Linz (Danube), Austria, assignor to Donau-Pharmazie G.m.b.H., Linz (Danube), Austria, a corporation of Austria
No Drawing. Original application Mar. 29, 1965, Ser. No. 443,707. Divided and this application Aug. 5, 1966, Ser. No. 570,418
Claims priority, application Austria, June 26, 1959, A 4,719/59
5 Claims. (Cl. 260—570.5)

The present application is a continuation-in-part of copending application Ser. No. 38,127, filed June 23, 1960, and now abandoned and entitled Valuable Tertiary Aniline Compounds, and Process of Making Same, and a division of copending application Ser. No. 443,707, filed Mar. 29, 1965 and entitled "N-(β-diethylamino ethyl)-N-[β-hydroxy-β-(phenyl)ethyl] Anilines and Salts Thereof."

The present invention relates to novel aniline derivatives and more particularly to novel tertiary aniline derivatives, and to methods of preparing same.

It is one object of the present invention to provide new and valuable aniline compounds which are characterized by their valuable pharmacological properties.

Another object of the present invention is to provide simple and effective methods of producing such new and valuable aniline compounds.

A further object of the present invention is to provide new and valuable pharmaceutical compositions useful in therapy.

Still another object of the present invention is to provide a method of relieving pain and inducing sleep, thereby having a respiration stimulating effect.

Still another object of the present invention is to provide a method of causing local anesthesia and retarding blood coagulation.

Other objects of the present invention and advantageous features thereof will become apparent as the description proceeds.

Compounds according to the present invention which have an analgesic effect without any inhibiting effect upon respiration and the autonomic nervous system are aniline compounds of Formula I

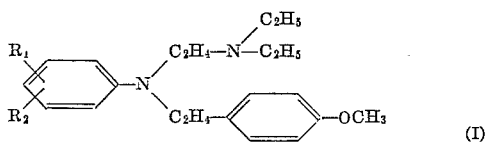

wherein $R_1$ and $R_2$ are hydrogen and/or methoxy, at least one of said $R_1$ and $R_2$ being methoxy.

Several methods are available for synthesizing the novel aniline compounds of the present invention.

Reduction of substituted anilides of the following Formula II

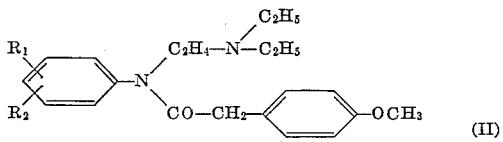

in which formula $R_1$ and $R_2$ represent the same substituents as indicated above, by means of metal hydrides such as lithium aluminum hydride, alkali metal or alkaline earth metal hydrides, and the like yields the substituted anilines of Formula I. Thereby, the acyl radical is readily reduced to the methylene radical. This is surprising since it is well known that reduction of benzoyl amides causes splitting up of the molecule and formation of the secondary amine and of benzyl alcohol (see Laszlo Szabo "Mag. kem. Foly" vol. 61 (1955), page 338).

When operating according to Szabo and using the stoichiometric amount of lithium aluminum hydride or a slight excess thereof (up to 30%) and employing solutions or suspensions of said reducing agent in ether or tetrahydrofuran, the method is useful for the preparation of the cleavage products, i.e., the secondary amine and the benzyl alcohol. Substantially no tertiary amine is formed.

Therefore, in order to avoid such cleavage, strongly reducing conditions are employed. Such conditions are characterized, for instance, by using a large excess of reducing agent and a solvent of a higher boiling point, preferably dioxane. This method has the additional advantage that lithium aluminum hydride is only very slightly soluble in dioxane at room temperature. Its solubility therein is increased to the required amount at an elevated temperature of about 70° C. As a result thereof the reaction sets in only at such a high temperature and proceeds very rapidly so that reductive cleavage of the amine is avoided.

The following examples are further illustrative of the method of the present invention, and it will be understood that the invention is not limited thereto.

EXAMPLE 1

N-(β-diethylamino ethyl)-N-[β-(p-methoxy phenyl) ethyl]-p-anisidine

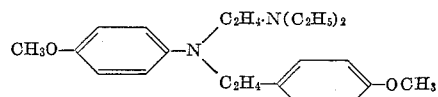

78 g. of N-(β-diethylamino ethyl)-N-(p-methoxy phenyl acetyl)-p-methoxy aniline are dissolved in 200 cc. of dioxane and the solution is added to a slurry of 8.5 g. of lithium aluminum hydride (210% of the stoichiometric amount of 4.0 g.) in 50 cc. of dioxane with vigorous stirring. A strong reaction sets in after a few minutes and is permitted to subside. The resulting reaction mixture is then heated with stirring on a water bath for two hours, and is cooled. A mixture of 20 cc. of dioxane and 20 cc. of water is cautiously added to destroy the excess of reducing agent. 700 cc. of a sodium hydroxide solution are then added and the mixture is stirred. Such an amount of solid potassium hydroxide is added that the dioxane separates from the aqueous phase and forms a supernatant layer. Approximately 100 g. of potassium hydroxide are required. The dioxane layer is separated from the aqueous alkaline layer which is extracted three times by shaking with dioxane and is then discarded. The combined dioxane solutions are dried over sodium sulfate and the dioxane is distilled off. The residue is fractionated by distillation in a vacuum. The tertiary amine is obtained as a colorless oil having a boiling point of 196° C./1 mm. Hg, and a refractive index of $n_D=1.558$. The yield is 54 g.

A lower boiling fraction of 22.5 g. of N-(β-diethyl-amino ethyl)-p-anisidine is recovered. Careful fractionation also yields a small amount of p-methoxy phenyl ethanol which is another cleavage product of the tertiary amine.

While lithium aluminum hydride is the preferred reducing agent because of the convenience with which it can be handled, of its ready availability, and of the simple manner in which its oxidation products may be disposed of, it will be understood by those skilled in this art, that other metal hydrides in equivalent amounts may be substituted therefor in the aforedescribed reaction without basic changes in the reaction mechanism. More specifically, the hydrides of the alkali metals and of the alkaline earth metals, such as sodium hydride, potassium hydride, calcium hydride, and barium hydride when employed in the method of the present invention in at least stoichiometric amounts produce also the desired aniline derivatives.

EXAMPLE 2

*N-(β-diethylamino ethyl)-N-[β-p-methoxy phenyl) ethyl]-o-anisidine*

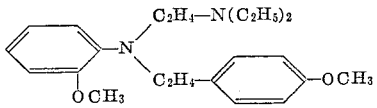

124 g. of β-(p-methoxy phenyl) ethylchloride and 165 g. of N-(β-diethylamino ethyl)-o-anisidine are jointly dissolved in a mixture of 80 cc. of toluene and 170 cc. of xylene. 34 g. of sodium amide are added. The mixture is vigorously stirred and its temperature rises spontaneously after a short period of time. Stirring is continued for eight hours, and the mixture is then left to stand for two days, whereupon it is refluxed for one hour. After preliminary cooling, the mixture is poured into ice water the solvent layer is separated from the aqueous phase and is dried over potassium carbonate. The solvent is evaporated, and the residue is fractionated by distillation in a vacuum. The following fractions are separately collected:

(1) *Low boiling fraction.*—up to 105° C./1 mm. Hg;
(2) *Intermediate fraction.*—105–125° C./0.3 mm. Hg;
(3) *High intermediate fraction.*—125–180° C./0.3 mm. Hg;
(4) *Main fraction.*—188° C./0.1 mm. Hg.

The third and fourth fractions are combined and repeatedly redistilled to obtain a uniform fraction having a boiling temperature of 188–191° C./0.1 mm. Hg. The free base obtained is dissolved in an excess of hydrochloric acid, set free from said solution by the addition of potassium hydroxide, extracted from the aqueous solution by means of ethylene dichloride, again transferred to an aqueous solution of 1:1 hydrochloric acid, set free by the addition of ammonia, and again extracted by means of ethylene dichloride. After evaporation of the solvent, the base is distilled over metallic sodium.

It is recovered in purified condition as a light yellow oil of the boiling point 178° C./0.05 mm. Hg; $n_D$=1.552.

Taking into consideration the N-(β-diethylamino ethyl)-o-ansidine recovered from the intermediate second fraction, the yield is 74% of the theoretical yield.

Other condensing agents may be substituted for sodium amide in the aforedescribed reaction without changing its course and without materially altering the yields obtained. Although sodium amide is preferred for practical reasons, it may be replaced by sodium alcholoate, potassium carbonate, or the hydroxide of the alkali metals, such as sodium or potassium hydroxide.

EXAMPLE 3

*N-(β-diethylamino ethyl)-N[β-(p-methoxy phenyl) ethyl]-o-anisidine*

137 g. of N-[β-(p-methoxy phenyl) ethyl]-o-anisidine and 80 g. of β-diethylamino ethylchloride are dissolved in 200 cc. of xylene. A suspension of 24 g. of sodium amide in 100 cc. of toluene is added to said mixture which is stirred for one day at room temperature, and left to stand for another day. It is then heated to boiling, whereupon a dense slurry of crystals forms which regains its fluidity after heating for about 30 minutes. The mixture is cooled and poured into ice water. The floating solvent layer is separated, dried over potassium carbonate, and distilled in a vacuum after evaporation of the solvent. Three separate fractions are collected:

(1) *Low boiling fraction.*—Up to 140° C.;
(2) *Intermediate fraction.*—160–180° C./0.3 mm. Hg;
(3) *High boiling fraction.*—185–188° C./0.1 mm. Hg.

40 g. of 30% suspension of sodium amide in toluene, 40 g. of β-diethylamino ethylchloride, and 100 cc. of xylene are added to the first fraction and the mixture is refluxed for ten hours. It is then cooled and worked up as above, whereby three fractions are obtained:

(1) *Low boiling fraction.*—Up to 140° C./1 mm. Hg;
(2) *Intermediate fraction.*—102–178° C./0.3 mm. Hg;
(3) *High boiling fraction.*—178–198° C./0.1 mm. Hg.

The combined high boiling fractions are dissolved in dichloro ethylene and the solution is shaken with aqueous 1:1 hydrochloric acid. The base is set free from the acid solution by means of ammonia and is again dissolved in dichloro ethylene. The solvent layer is separated from the aqueous layer and the solvent is evaporated. The residue is distilled in a vacuum and the fraction obtained at 162–175° C./0.05 mm. Hg is repeatedly distilled over a fractionating column.

The purified base is obtained as a light yellow oil of the boiling point: 177–178° C./0.05 mm. Hg; $n_D$=1.552.

EXAMPLE 4

*N-(β-diethylamino ethyl)-N-[β-(p-methoxy phenyl) ethyl]-o-anisidine*

273 g. of N-(β-diethylamino ethyl)-N-(p-methoxy phenyl acetyl)-o-methoxy aniline are dissolved in 500 cc. of tetrahydrofuran. A suspension of 27 g. of lithium aluminum hydride in 500 cc. of tetrahydrofuran is slowly added thereto. The ensuing reaction is permitted to subside and the reaction mixture is refluxed for 30 minutes. 3 g. of lithium aluminum hydride are added to ensure completion of the reaction. 40 cc. of water, 40 cc. of a 15% sodium hydroxide solution, and 120 cc. of additional water are consecutively added in small amounts while the reaction mixture is being cooled. The lithium aluminum hydride is decomposed thereby and the hydroxides of lithium and aluminum are precipitated in granular form by heating the mixture for 20 minutes. The solution is filtered and evaporated by heating on a boiling water bath. The residue is taken up in dichloro ethylene and extracted from the solvent by shaking with aqueous 1:1 hydrochloric acid. The base is set free by the addition of ammonia and is again taken up in dichloro ethylene. The solvent is dried over potassium carbonate and evaporated. The residue is distilled in a vacuum. The fraction boiling at 188–191° C./0.1 mm. Hg is twice redistilled. The base is obtained as a light yellow oil having a boiling point of 178° C./0.05 mm. Hg; $n_D$=1.552. The yield is 55%.

EXAMPLE 5

*N-(β-diethylamino ethyl)-N-[β-(p-methoxy phenyl) ethyl]-2,4-dimethoxy aniline*

CH₃O—⟨⟩—N(C₂H₄—N(C₂H₅)₂)(CH₂—CH₂—⟨⟩—OCH₃), OCH₃

N-(p-methoxy phenyl acetyl)-N-(β-diethylamino ethyl)-2,4-dimethoxy anilide of the formula

CH₃O—⟨⟩—N(C₂H₄—N(C₂H₅)₂)(CO—CH₂—⟨⟩—OCH₃), OCH₃ is obtained by reacting 2,4-dimethoxy aniline with β-diethylamino ethylchloride in xylene with the addition of potassium carbonate followed by acylation by means of p-methoxy phenyl acetylchloride. This reaction proceeds according to the following equation:

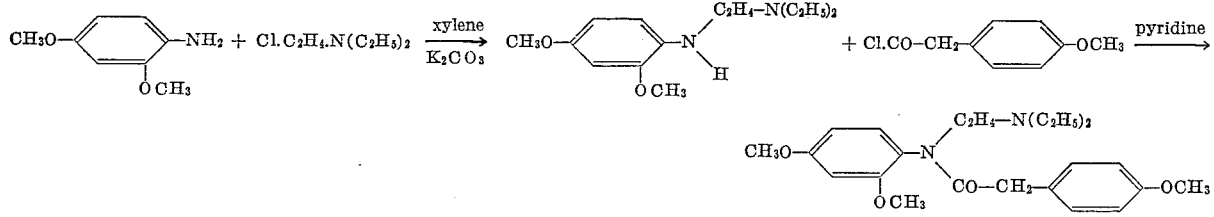
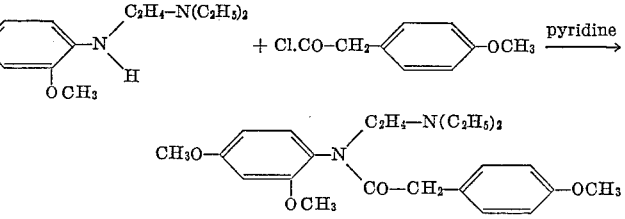

38.6 g. of said p-methoxy phenyl acetyl-N-(β-diethylamino ethyl)-2,4-dimethoxy anilide of the above given formula are dissolved in 100 cc. of dioxane. The resulting solution is rapidly added to a suspension of 5 g. of finely pulverized lithium aluminum hydride in 200 cc. of absolute dioxane while stirring vigorously. Violent reaction with foaming sets in after a short period of time. As soon as said reaction subsides, the mixture is stirred on the water bath for one hour. After cooling, excess lithium aluminum hydride is decomposed by the successive addition of 15 cc. of a 15% sodium hydroxide solution, 15 cc. of water, and again 15 cc. of said sodium hydroxide solution, while stirring. The precipitated granular lithium hydroxide and aluminum hydroxide are filtered off by suction and are washed repeatedly with fresh dioxane. The combined dioxane solutions are thoroughly shaken with 40% sodium hydroxide solution. The supernatant dioxane layer is separated from the aqueous alkaline layer and is dried over solid potassium hydroxide. The dioxane is then distilled off and the residue is distilled by using a fractionating column. The distillate is a viscous oil which is dissolved in hydrochloric acid 1:4. Ammonia is added to the acid solution to render the same alkaline. The amine set free thereby is extracted by means of dichloro methane. The solvent is then distilled off and the remaining viscous oil is distilled in a vacuum in an air bath from a tube with bulbar enlargements. 25 g. of a viscous, light yellow oil of the boiling point 170–175° C./0.3 mm. Hg are obtained thereby. The distillation temperature was measured in the air bath used for heating the bulb tube.

EXAMPLE 6

*N-(β-diethylamino ethyl)-N-[β-(p-methoxy phenyl) ethyl]-m-anisidine*

233 g. of p-methoxy phenyl acetylchloride dissolved in 250 cc. of dioxane are added to 260 g. of N-(β-diethylamino ethyl)-m-anisidine in 250 cc. of dioxane. The mixture is boiled under reflux for 6 hours, cooled, diluted with 500 cc. of dioxane, and shaken with 40% sodium hydroxide solution. The separated dioxane solution is dried over potassium carbonate and the solvent is distilled off. The residue is distilled in a vacuum yielding (a) a low boiling fraction boiling up to 190° C./0.5 mm. Hg and
(b) a main fraction boiling between 190° C. and 210° C./0.5 mm. Hg.

On repeated redistillation of said crude main fraction, N-(β-diethylamino ethyl)-N-[β-(p-methoxy phenyl)aceto]-m-anisidine is obtained in the form of a light yellow oil boiling at 190° C./0.1 mm. Hg. Yield: 184 g.

20 g. of lithium aluminum hydride are suspended in 500 cc. of dioxane. A solution of 184 g. of the above described m-anisidine compound in 500 cc. of dioxane is added slowly drop by drop thereto, whereby the temperature of the reaction solution increases. Boiling of the solution must be avoided by controlling the addition of the dioxane solution. Thereafter, the mixture is heated on the boiling water bath for one hour, while stirring. The resulting complex compound is decomposed by carefully adding first 20 cc. of 15% sodium hydroxide solution, then 20 cc. of water, thereafter 60 cc. of 15% sodium hydroxide solution, and finally 35 cc. of water. After filtering off the inorganic salts, the dioxane solution is dried over solid potassium hydroxide. The dioxane is distilled off. The residue is taken up in benzene. The base is purified by shaking with hydrochloric acid, adding ammonia to the hydrochloric acid solution, and extracting the ammoniacal solution with benzene. After repeated redistillation, 85.5 g. of N-(β-diethylamino ethyl)-N-[β-(p-methoxy phenyl)ethyl]m-anisidine of the boiling point 185° C./0.5 mm. Hg are obtained in the form of a light yellow oil.

The base is dissolved in 100 cc. of absolute ethanol. 54.8 cc. of 8.8 N alcoholic hydrochloric acid are added to said solution which is then allowed to stand. The precipitated crystalline hydrochloride is filtered off by suction, washed with ether, and dried by means of absolute ethanol. The base is set free from the hydrochloride by means of ammonia. Its boiling point is 185° C./0.05 mm. Hg; $n_D$:1.559. The initially oily base crystallizes on standing. Its melting point is 95° C. on recrystallization from a small amount of isopropanol.

Of course, other secondary amines then those used in the preceding examples may be employed, for instance, the N-(β-diethylamino ethyl)-2,4- or 2,5-dimethoxy anilines and others. Otherwise, the reaction proceeds in the same manner as described in Examples 2 and 3.

Acylation of the secondary amines for preparing the acid amides to be reduced to the tertiary amines according to the present invention may be effected with other reactive acid derivatives than the acid chlorides such as the bromides, anhydrides, mixed anhydrides, or the acids themselves may also be employed. Otherwise, reduction of the resulting acylated secondary amines is carried out by following the procedure described in the preceding examples.

Thus the following compounds of Formula I have been produced in addition to those of Examples 1 to 6:

EXAMPLE 7

*N-(β-diethylamino ethyl)-N-[β-(p-methoxy phenyl) ethyl]-2,5-dimethoxy aniline*

The tertiary aniline compounds according to the present invention are preferably employed in therapy in the form of their acid addition salts. The free bases may also be administered in tablet or the like form adsorbed to the pharmaceutical excipient.

The acid addition salts are prepared in a manner known per se. The preferred method is illustrated by the following example although the preparation of acid addition salts is by no means limited thereto.

EXAMPLE 8

50 g. of N-(β-diethylamino ethyl)-N-[β-(p-methoxy phenyl) ethyl]-p-anisidine prepared by proceeding according to Example 1, are dissolved in 25 cc. of isopropanol. 61 cc. of a 5 N alcoholic hydrochloric acid solution are added thereto while cooling with ice and stirring. The precipitated white needles are recrystallized from isopropanol. The resulting dihydrochloride has a melting point of 178° C.

Other acid addition salts of the tertiary anilines according to the present invention, for instance, with other therapeutically acceptable inorganic acids, such as hydrobromic acid, sulfuric acid, nitric acid, phosphoric acid, or with substantially non-toxic, therapeutically acceptable organic acids, such as acetic acid, propionic acid, maleic acid, succinic acid, gluconic acid, malic acid, citric acid, tartaric acid, benzoic acid, salicylic acid, acetyl salicylic acid, phthalic acid, nicotinic acid, isonicotinic acid, furan-2-carboxylic acid, and the like may also be prepared either in solid form or in form of their solutions according to the method described in Example 16 or by other suitable methods.

The preferred and most effective compounds according to Formula I of this invention are the following compounds:

(A) N-(β-diethylamino ethyl)-N-[β-(p-methoxy phenyl) ethyl]-p-anisidine according to Example 1;

(B) N-(β-diethylamino ethyl)-N-[β-(p-methoxy phenyl)ethyl]-m-anisidine according to Example 6.

Pharmacological tests were carried out with compounds according to the present invention.

The toxicity of the above mentioned compound was determined on groups of six white mice each with increasing doses. The $LD_{50}$ was calculated by probit analysis 24 hours after administration.

The analgesic effect was determined by placing the test and control animals on a heated metal plate kept constantly at a temperature of 52.7° C. and measuring the reaction time of the animals to the heat stimulus. The following Table I illustrates the results obtained in these tests whereby the analgesic effect $ED_{50}$ and the toxicity $LD_{50}$ were compared with that of morphine hydrochloride:

TABLE I

| Compound | Manner of administration | $LD_{50}$ | $ED_{50}$ | Therapeutic index |
| --- | --- | --- | --- | --- |
| Morphine HCl | Oral | 580 | 27 | 21.4 |
| A | do | 340 | 80 | 4.25 |
| A | Intraperitoneal | 280 | 46 | 6.1 |
| A | Intravenous | 160 | 22.5 | 7.1 |
| A | Subcutaneous | 400 | 71 | 5.6 |
| B | do | 288 | 40 | 7.2 |
| Example 2 | Oral | | 160 | |
| Example 7 | do | | 250 | |
| Example 5 | do | | 192 | |

The effect of the analgesically most effective compounds A and B upon respiration was tested on rabbits by intravenous administration whereby the respiratory minute volume was measured by the method of Gaddum. The following Table II illustrates the results obtained.

TABLE II

| Compound | Dose administered, Mg./Kg. | Increase of respiratory minute volume in percent |
| --- | --- | --- |
| A | 1.8 | 70 |
| B | 1.8 | 80 |
| Pentylene tetrazol | 5.0 | 65 |

This respiration stimulating effect is highly advantageous and distinguishes the compounds of Formula I from all other analgesic agents. See, for instance, the standard textbook on "Medicinal Chemistry," by Alfred Burger, 2nd edition, Interscience Publishers, Inc., New York, 1960, page 313, right-hand column, second paragraph, lines 8 to 12, where it is stated that all analgesics "produce respiratory depression which may become a life-threatening phenomenon in especially susceptible individuals (or sometimes from only a slight increase in dose)." This respiration stimulating effect can be observed even when subjecting rabbits to a pretreatment with morphine hydrochloride.

The compounds of Formula I have also a noteworthy spasmolytic effect. For instance, the antihistaminic effect of the above mentioned compound A is as high as that of the highly effective antihistaminic agent pyrilamine while compound B exhibits a spasmolytic activity against spasms caused by barium chloride which is ten times as high as that of papaverine.

The new tertiary anilines and their acid addition salts can be administered orally, parenterally, or in the form of suppositories. Compositions as they are used for the purpose of the present invention comprise, for instance, tablets, pills, dragees, lozenges, and the like shaped preparations. The compounds may also be administered in powder form, preferably enclosed in gelatin and the like capsules. Oral administration in liquid form, such as in the form of emulsions, suspensions, sirups, and the like is also possible. These solid and liquid preparations are produced in a manner known to the art of compounding and processing pharmaceutical products whereby the conventional diluting agents, binding agents, lubricants, expanding agents, and the like excipients, such as lactose, cane sugar, dextrins, starch, talc, kaolin, magnesium hydroxide, magnesium carbonate, pectin, gelatin, agar, bentonite, stearic acid, magnesium stearate, and others are employed.

The following examples serve to illustrate such pharmaceutical preparations without, however, limiting the same thereto.

EXAMPLE 9

Tablets

|  | G. |
| --- | --- |
| N-(β-diethylamino ethyl) - N-[β-(p-methoxy phenyl) ethyl]-p-anisidine | 75 |
| Colloidal silica sold under the trademark "Aerosil" | 56 |

These two ingredients are intimately mixed with each other and the following substances are admixed thereto:

|  | G. |
| --- | --- |
| Corn starch | 99 |
| Milk sugar | 120 |
| Magnesium stearate | 2 |
| Gelatin | 1.5 |
| Cocoa butter | 1.5 |

The resulting mixture is compressed to 1000 tablets, each tablet weighing about 355 mg. and containing about 75 mg. of the analgesic tertiary aniline compound.

EXAMPLE 10

Tablets

Hydrochloride of N-(β-diethylamino ethyl)-N-[β-(p-methoxy phenyl) ethyl]-p-anisidine, 150 g. are intimately mixed with:

|  | G. |
| --- | --- |
| Milk sugar | 331 |
| Corn starch | 144 |
| White gelatin | 7 |
| Cocoa butter | 7 |
| Magnesium stearate | 11 |

The mixture is tabletted and yields 1000 tablets, each tablet weighing about 650 mg. and containing about 150 mg. of the analgesic tertiary aniline compound.

EXAMPLE 11

Dragees

The tablets obtained according to Example 9 are sugar-coated by rotating in a coating pan with sugar solution. Sugar-coating is repeated until each dragee has attained a weight of about 500 mg.

EXAMPLE 12

Suppositories 100 g. of the free base N-(β-diethylamino ethyl)-N-[β-(p-methoxy phenyl) ethyl]-p-anisidine are intimately mixed with 100 g. of colloidal silica sold under the trademark "Aerosil." The mixture is incorporated into 3,000 g. of a molten conventional suppository base. 1,000 suppositories, each weighing 3.2 g. and containing the free base are obtained.

In place of the free base, there may be employed the hydrochloride whereby the addition of silica can be omitted.

EXAMPLE 13

*Injectable solution*

25 g. of the hydrochloride of N-(β-diethylamino ethyl]-N-[β-(p-methoxy phenyl) ethyl]-p-anisidine are dissolved in 2,200 cc. of bidistilled sterilized water. The solution is filled into ampoules, each ampoule containing 2.2 cc. and the ampoules are sterilized in an autoclave at 120° C.

Injectable solutions can also be prepared by adding the respective base to an aqueous solution of the stoichiometric amount of an acid, for instance, of hydrochloric acid, nitric acid, or of an organic acid such as acetic acid, succinic acid, ascorbic acid, gluconic acid, lactic acid, maleic acid, fumaric acid, salicylic acid, and the like.

It should be understood, of course, that the foregoing disclosure relates to only preferred embodiments of the present invention and that it is intended to cover all changes and modifications of the examples of the invention herein chosen for the purpose of the disclosure which do not constitute departures from the spirit and scope of the present invention set forth herein and in the appended claims.

The terms "1:1 hydrochloric acid" or "1:4 hydrochloric acid," respectively, as used hereinabove in the specification, designate concentrated hydrochloric acid diluted with an equal volume of water or, respectively, with four times its volume of water.

I claim:
1. The compound selected from the group consisting of the N-(β-diethylamino ethyl)-N-[β-(p-methoxy phenyl) ethyl]aniline compound of the formula

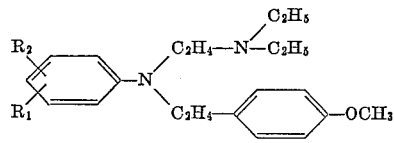

wherein
$R_1$ and $R_2$ are members selected from the group consisting of hydrogen and methoxy, at least one of said members $R_1$ and $R_2$ being methoxy,
and their salts with therapeutically acceptable acids.

2. N-(β-diethylamino ethyl)-N-[β-(p-methoxy phenyl) ethyl]-p-anisidine.

3. N-(β-diethylamino ethyl)-N-[β-(p-methoxy phenyl) ethyl]-o-anisidine.

4. N-(β-diethylamino ethyl)-N-[β-(p-methoxy phenyl) ethyl]-2,4-dimethoxy aniline.

5. N-(β-diethylamino ethyl)-N-[β-(p-methoxy phenyl) ethyl]-m-anisidine.

No references cited.

CHARLES B. PARKER, *Primary Examiner.*

ROBERT V. HINES, *Assistant Examiner.*